United States Patent
Newman

(10) Patent No.: US 10,212,352 B2
(45) Date of Patent: *Feb. 19, 2019

(54) COMPRESSION AND DECODING OF SINGLE SENSOR COLOR IMAGE DATA

(71) Applicant: GoPro, Inc., San Mateo, CA (US)

(72) Inventor: David A. Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,532

(22) Filed: Jul. 19, 2017

(65) Prior Publication Data
US 2017/0318229 A1    Nov. 2, 2017

Related U.S. Application Data

(63) Continuation of application No. 15/215,397, filed on Jul. 20, 2016, now Pat. No. 9,736,384, which is a
(Continued)

(51) Int. Cl.
*G06K 9/36* (2006.01)
*H04N 5/232* (2006.01)
(Continued)

(52) U.S. Cl.
CPC ....... *H04N 5/23293* (2013.01); *G06F 3/0484* (2013.01); *G06K 9/36* (2013.01);
(Continued)

(58) Field of Classification Search
CPC .... H04N 9/045; H04N 9/646; H04N 5/23245; H04N 5/23293; H04N 5/23212;
(Continued)

(56) References Cited

U.S. PATENT DOCUMENTS 5,412,741 A   5/1995   Shapiro
5,448,315 A   9/1995   Soohoo
(Continued)

FOREIGN PATENT DOCUMENTS

EP    0561593 A2    9/1993
WO    WO 94/24815 A1    10/1994
WO    WO 99/52277 A1    10/1999

OTHER PUBLICATIONS

Andreopoulos, Y. et al., "Wavelet-Based Fully-Scalable Video Coding with In-Band Prediction," Proc. 3rd IEEE Benelux Signal Processing Symposium (SPS-2003), Leuven, Belgium, Mar. 21-22, 2002, pp. S02-1-S01-4.
(Continued)

*Primary Examiner* — Ali Bayat
(74) *Attorney, Agent, or Firm* — Gazdzinski & Associates, PC

(57) ABSTRACT

A method is described to greatly improve the efficiency of and reduce the complexity of image compression when using single-sensor color imagers for video acquisition. The method in addition allows for this new image compression type to be compatible with existing video processing tools, improving the workflow for film and television production.

21 Claims, 9 Drawing Sheets

Typical Bayer sensor

Related U.S. Application Data continuation of application No. 14/676,776, filed on Apr. 1, 2015, now Pat. No. 9,438,799, which is a continuation of application No. 14/504,326, filed on Oct. 1, 2014, now Pat. No. 9,025,896, which is a continuation of application No. 14/222,549, filed on Mar. 21, 2014, now Pat. No. 8,879,861, which is a continuation of application No. 14/108,240, filed on Dec. 16, 2013, now Pat. No. 8,718,390, which is a continuation of application No. 13/968,423, filed on Aug. 15, 2013, now Pat. No. 8,644,629, which is a continuation of application No. 13/683,965, filed on Nov. 21, 2012, now Pat. No. 8,538,143, which is a continuation of application No. 13/196,175, filed on Aug. 2, 2011, now Pat. No. 8,345,969, which is a continuation of application No. 11/689,975, filed on Mar. 22, 2007, now Pat. No. 8,014,597.

(60) Provisional application No. 60/784,866, filed on Mar. 22, 2006.

(51) Int. Cl.

| | |
|---|---|
| *H04N 1/64* | (2006.01) |
| *H04N 9/04* | (2006.01) |
| *G06T 9/00* | (2006.01) |
| *H04N 19/117* | (2014.01) |
| *H04N 19/136* | (2014.01) |
| *H04N 19/186* | (2014.01) |
| *H04N 19/44* | (2014.01) |
| *G06F 3/0484* | (2013.01) |
| *H04N 19/85* | (2014.01) |
| *H04N 5/265* | (2006.01) |

(52) U.S. Cl.
CPC ............... *G06T 9/00* (2013.01); *H04N 1/648* (2013.01); *H04N 5/23245* (2013.01); *H04N 5/265* (2013.01); *H04N 9/045* (2013.01); *H04N 19/117* (2014.11); *H04N 19/136* (2014.11); *H04N 19/186* (2014.11); *H04N 19/44* (2014.11); *H04N 19/85* (2014.11)

(58) Field of Classification Search
CPC .... H04N 5/23232; H04N 5/235; H04N 5/265; H04N 19/44; G06T 2207/10024; G06T 2207/10016; G06T 9/00
USPC ......................................................... 382/232
See application file for complete search history.

(56) References Cited

U.S. PATENT DOCUMENTS

| | | | |
|---|---|---|---|
| 5,491,561 A | 2/1996 | Fukuda | |
| 5,506,619 A | 4/1996 | Adams et al. | |
| 5,600,373 A | 2/1997 | Chui et al. | |
| 5,600,646 A * | 2/1997 | Polomski ................. | H04N 7/15 348/14.09 |
| 5,654,737 A | 8/1997 | Der et al. | |
| 5,729,691 A | 3/1998 | Agarwal | |
| 5,754,700 A | 5/1998 | Kuzma | |
| 5,801,685 A | 9/1998 | Miller et al. | |
| 5,912,709 A | 6/1999 | Takahashi | |
| 6,005,621 A | 12/1999 | Linzer et al. | |
| 6,028,807 A | 2/2000 | Awsienko | |
| 6,091,777 A | 7/2000 | Guetz et al. | |
| 6,091,778 A | 7/2000 | Sporer et al. | |
| 6,091,862 A | 7/2000 | Okisu | |
| 6,104,441 A | 8/2000 | Wee et al. | |
| 6,144,773 A | 11/2000 | Kolarov et al. | |
| 6,148,111 A | 11/2000 | Creusere | |
| 6,154,493 A | 11/2000 | Acharya et al. | |
| 6,154,600 A | 11/2000 | Newman et al. | |
| 6,154,771 A | 11/2000 | Rangan et al. | |
| 6,181,335 B1 | 1/2001 | Hendricks et al. | |
| 6,198,477 B1 | 3/2001 | Kurtze et al. | |
| 6,208,759 B1 | 3/2001 | Wells | |
| 6,226,038 B1 | 5/2001 | Frink et al. | |
| 6,229,929 B1 | 5/2001 | Lynch et al. | |
| 6,236,805 B1 | 5/2001 | Sebestyen | |
| 6,246,438 B1 | 6/2001 | Nishikawa et al. | |
| 6,301,428 B1 | 10/2001 | Linzer | |
| 6,337,881 B1 | 1/2002 | Chaddha | |
| 6,357,047 B1 | 3/2002 | Kurtze et al. | |
| 6,381,280 B1 | 4/2002 | Lynch et al. | |
| 6,414,686 B1 | 7/2002 | Protheroe et al. | |
| 6,516,137 B1 | 2/2003 | Posch et al. | |
| 6,539,122 B1 | 3/2003 | Abousleman | |
| 6,570,924 B1 | 5/2003 | Lynch et al. | |
| 6,597,739 B1 | 7/2003 | Li et al. | |
| 6,654,850 B2 | 11/2003 | Fox et al. | |
| 6,658,057 B1 | 12/2003 | Chen et al. | |
| 6,788,823 B2 | 9/2004 | Allred et al. | |
| 6,819,801 B2 | 11/2004 | Kakarala et al. | |
| 6,825,876 B1 | 11/2004 | Easwar et al. | |
| 6,948,128 B2 | 9/2005 | Ibrahim et al. | |
| 6,954,498 B1 | 10/2005 | Lipton | |
| 7,088,392 B2 * | 8/2006 | Kakarala ............... | G06T 3/4007 348/222.1 |
| 7,372,999 B2 | 5/2008 | Oneda et al. | |
| 7,480,417 B2 | 1/2009 | Malvar | |
| 8,014,597 B1 | 9/2011 | Newman | |
| 8,127,232 B2 * | 2/2012 | Pavley ................. | G11B 27/034 715/747 |
| 8,644,629 B2 | 2/2014 | Newman | |
| 8,718,390 B1 | 5/2014 | Newman | |
| 8,879,861 B2 | 11/2014 | Newman | |
| 8,972,867 B1 * | 3/2015 | Pavley ................. | G11B 27/034 715/723 |
| 9,025,896 B2 | 5/2015 | Newman | |
| 9,438,799 B2 | 9/2016 | Newman | |
| 2002/0032027 A1 | 3/2002 | Kirani et al. | |
| 2003/0080984 A1 | 5/2003 | Hunter | |
| 2003/0217296 A1 | 11/2003 | Ma | |
| 2004/0008779 A1 | 1/2004 | Lai et al. | |
| 2004/0032516 A1 | 2/2004 | Kakarala | |
| 2004/0126019 A1 | 7/2004 | Ikebe et al. | |
| 2004/0174441 A1 | 9/2004 | Castorina et al. | |
| 2007/0252074 A1 | 11/2007 | Ng et al. | |
| 2008/0239093 A1 | 10/2008 | Easwar et al. | |
| 2009/0033752 A1 | 2/2009 | Bodnar et al. | |

OTHER PUBLICATIONS

Chao, H. et al., "An Approach to Integer Wavelet Transformations for Lossless Image Compression," SBIR Contract N00039-94-C-0013, 1997, 20 pages.

Chou et al., "An Approach to Integer Wavelet Transformations for Lossless Image Compression" SBIR Contract N00039-94-C-0013, 1997.

Declaration of Alan C. Bovik, Ph.D., Apr. 18, 2017, 150 Pages, U.S. Pat. No. 9,025,896 B2, *C&A Marketing, Inc. v. GoPro, Inc.*, Inter Partes Review No. IPR2017-01300, United States Patent and Trademark Office, Before the Patent Trial and Appeal Board.

Girod, B. et al., "Multiresolution Coding of Image and Video Signals," Invited Paper, Telecommunications Institute I, University of Erlangen-Nuremberg, D-91058 Erlangen, Germany, Sep. 1998, Rhodes, Greece, 4 pages.

Girod, B. et al., "Scalable Video Coding with Multiscale Motion Compensation and Unequal Error Protection," in Proc. International Symposium on Multimedia Communications and Video Coding, New York, Oct. 1995, pp. 1-8.

*GoPro, Inc.* v. *C&A Marketing, Inc.* et al, 5-16-cv-03590 (CAND), Complaint for Patent Infringement of U.S. Pat. Nos. 9,025,896 and 9,282,226, filed Jun. 27, 2016, 10 Pages.

GoPro's Amended Disclosure of Asserted Claims and Infringement Contentions, Apr. 5, 2017, 38 Pages, Case No. 16-cv-03590-JST,

(56) References Cited

OTHER PUBLICATIONS

*GoPro, Inc.* v. *C&A Marketing, Inc.*, United States District Court for the Northern District of California San Francisco Division.
Gormish, M.J. et al., "Lossless and Nearly Lossless Compression of High-Quality Images," in Proc. of SPIE, Mar. 1997, pp. 62-70, vol. 3025.
Joint Claim Construction and Prehearing Statement, Mar. 17, 2017, 35 Pages, Case No. 16-cv-03590-JST, *GoPro, Inc.* v. *C&A Marketing, Inc.*, United States District Court for the Northern District of California San Francisco Division.
PCT Application PCT/US02/20536 International Search Report dated Nov. 5, 2002, 32 pages.
Petition for Inter Partes Review, U.S. Pat. No. 9,025,896 B2, *C&A Marketing, Inc.* v. *GoPro, Inc.*, Inter Partes Review No. IPR2017-01300, filed Apr. 21, 2017, 84 Pages, United States Patent and Trademark Office, Before the Patent Trial and Appeal Board.
Prosecution History of U.S. Pat. No. 9,025,896 B2, dated May 5, 2015, 92 Pages.
Report on the Filing or Determination of an Action Regarding a Patent or Trademark, Case 5:16-cv-03590, Filed Jun. 27, 2016, 1 Page.
Schwartz, E. et al., "Implementation of Compression with Reversible Embedded Wavelets," in Proc. SPIE, 1995, 12 pages.
Taubman, D. et al., "Multirate 3-D Subband Coding of Video," IEEE Trans. Image processing, Sep. 1994, pp. 572-588, vol. 3, No. 5.
U.S. Appl. No. 10/183,090 Non-Final Rejection dated Jun. 21, 2005, 9 pages.
U.S. Appl. No. 10/183,090, filed Jun. 26, 2002 and abandoned Aug. 28, 2006, 35 pages.
U.S. Appl. No. 10/779,335 Final Rejection dated May 26, 2009, 11 pages.
U.S. Appl. No. 10/779,335 Final Rejection dated Nov. 22, 2010, 20 pages.
U.S. Appl. No. 10/779,335 Non-Final Rejection dated Dec. 3, 2008, 9 pages.
U.S. Appl. No. 10/779,335 Non-Final Rejection dated Mar. 3, 2010, 18 pages.
U.S. Appl. No. 11/689,975 Non-Final Rejection dated Sep. 2, 2010, 6 pages.
U.S. Appl. No. 13/196,175 Final Rejection dated May 29, 2012, 8 Pages.
U.S. Appl. No. 13/196,175 Non-Final Rejection dated Dec. 28, 2011, 10 Pages.
U.S. Appl. No. 13/196,175 Non-Final Rejection dated Oct. 26, 2012, 6 Pages.
U.S. Appl. No. 13/683,965, Non-Final Rejection dated Mar. 18, 2013, 7 Pages.
U.S. Appl. No. 14/108,240, Non-Final Rejection dated Jan. 17, 2014, 6 Pages.
U.S. Appl. No. 14/222,549, Non-Final Rejection dated Jun. 24, 2014, 6 Pages.
U.S. Appl. No. 14/504,326, Non-Final Rejection dated Nov. 21, 2014, 6 Pages.
U.S. Appl. No. 14/676,776, Non-Final Rejection dated Feb. 11, 2016, 7 Pages.
U.S. Appl. No. 60/784,866, filed Mar. 22, 2006, 11 Pages.
Vass, J. et al., "Efficient Three-Dimensional Wavelet Codecs for Networked Video Communication," in Proceedings of IEEE International Conference on Image Processing, Kobe, Japan, Oct. 1999, pp. 565-569.
Wee, S.J. et al., "A Scalable Source Coder for Hybrid HDTV Terrestrial Broadcasting System," IEEE ICIP, Austin, Texas, Oct. 1994, pp. 238-242.
Wu, F. et al., "A Framework for Efficient Progressive Fine Granularity Scalable Video Coding," IEEE Trans. Circuits and Systems for Video Technology, Mar. 2001, pp. 332-344, vol. 11, No. 3.
Zandi, A. et al., "CREW: Compression with Reversible Embedded Wavelets," Data Compression Conference, 1995, pp. 212-221.
United States Office Action, U.S. Appl. No. 15/215,397, dated Feb. 24, 2017, eight pages.

* cited by examiner

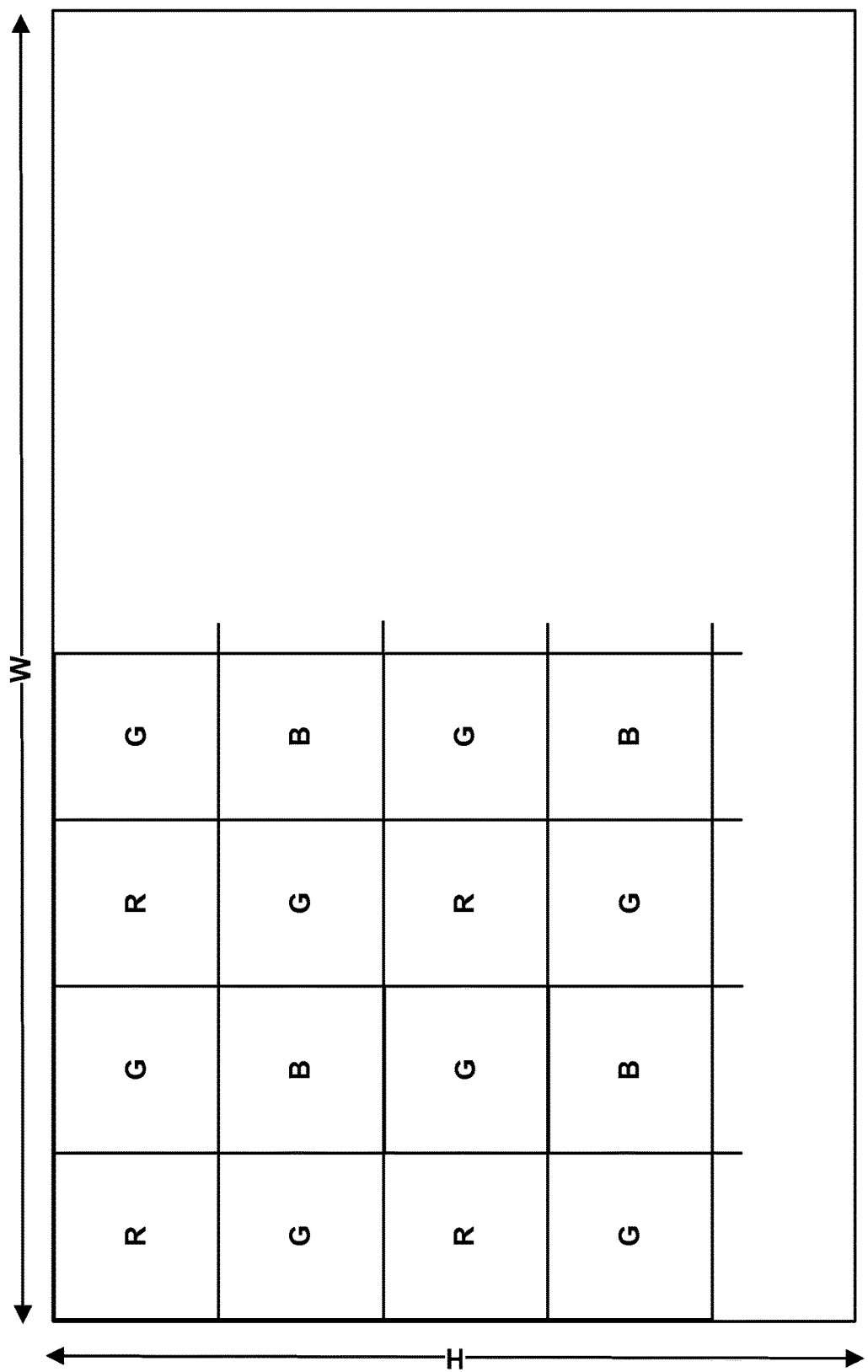
FIG. 1: Typical Bayer sensor

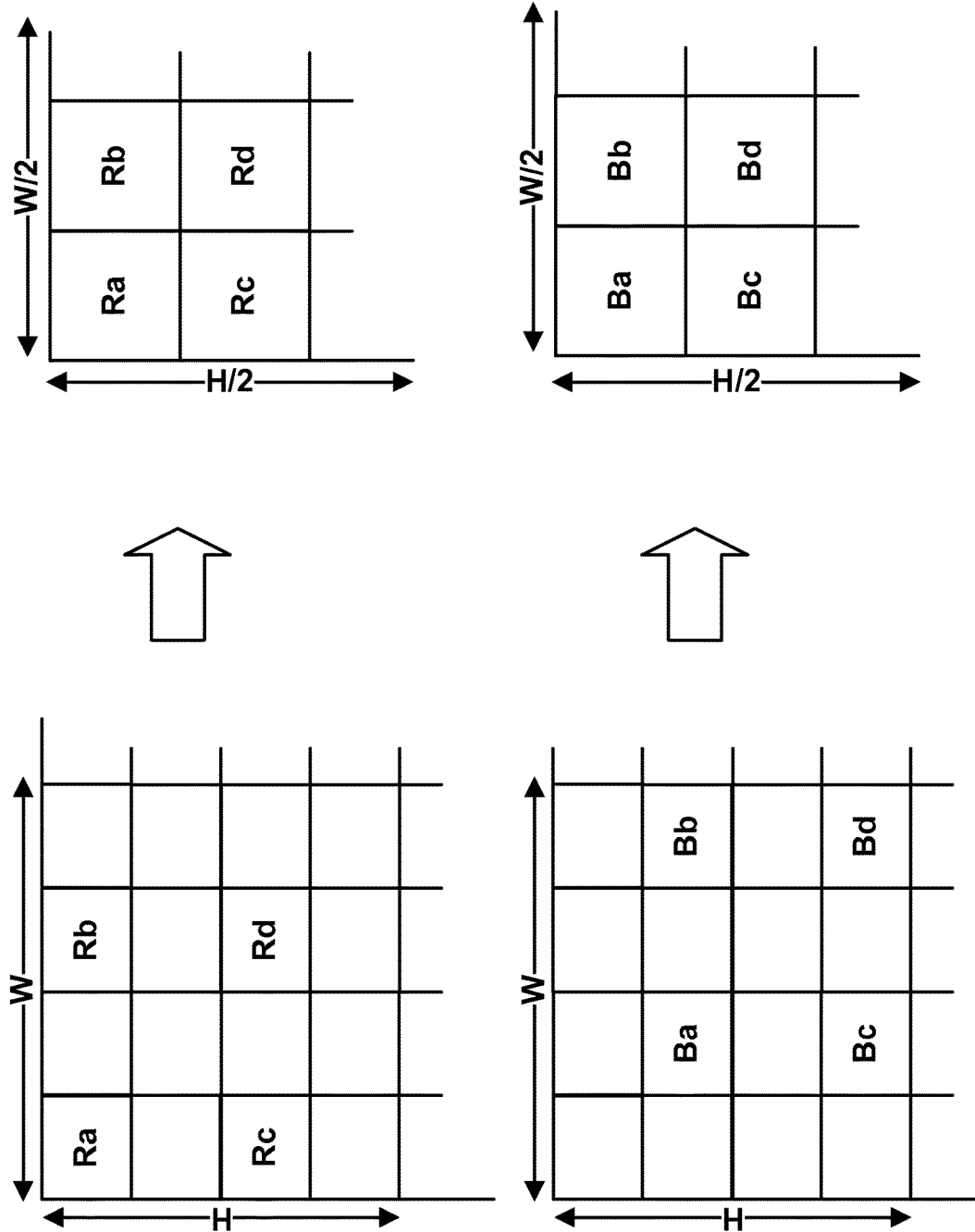
FIG. 2: Fast extraction of color primaries

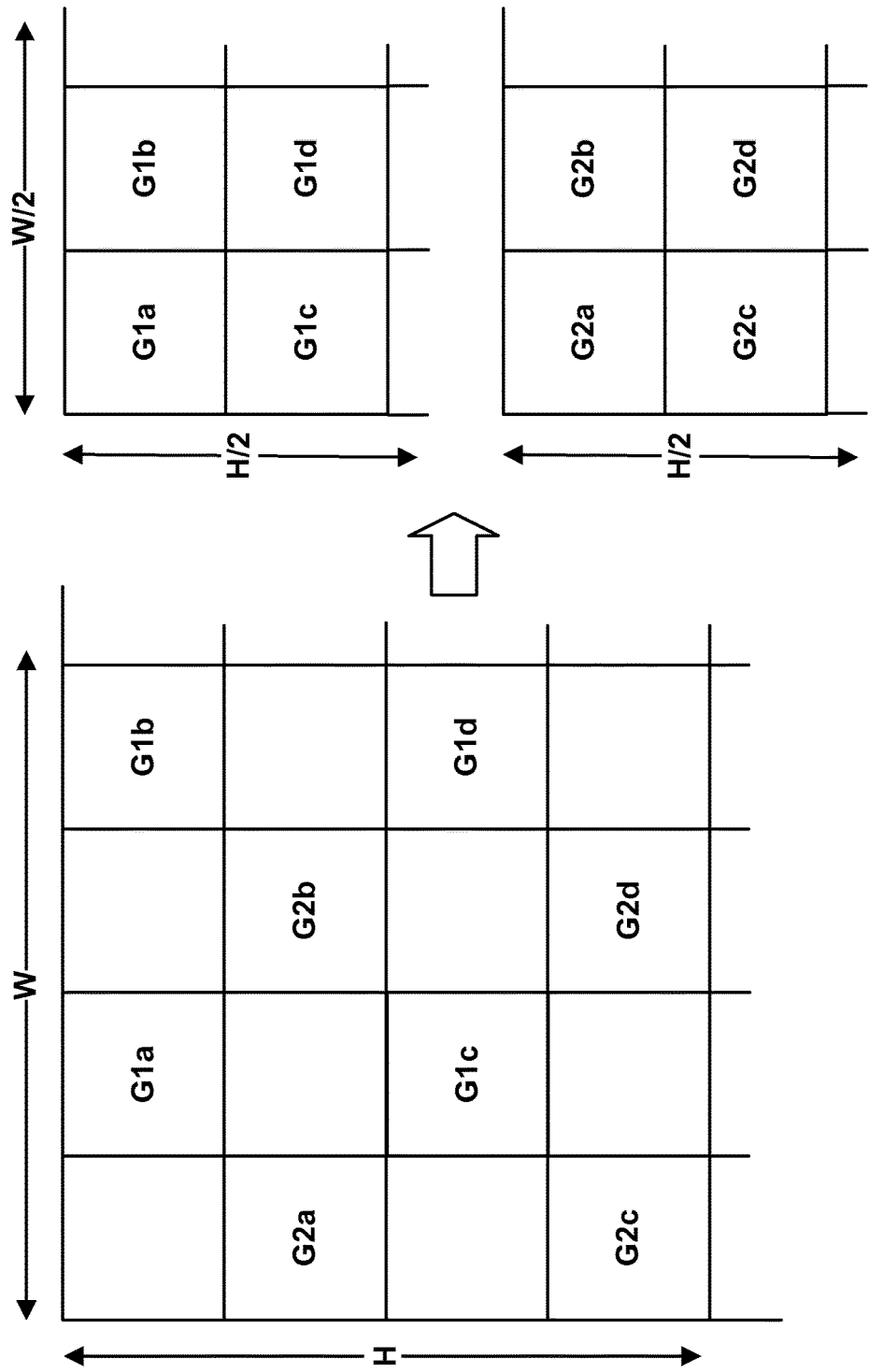
FIG. 3: Green pixel extraction into two planes

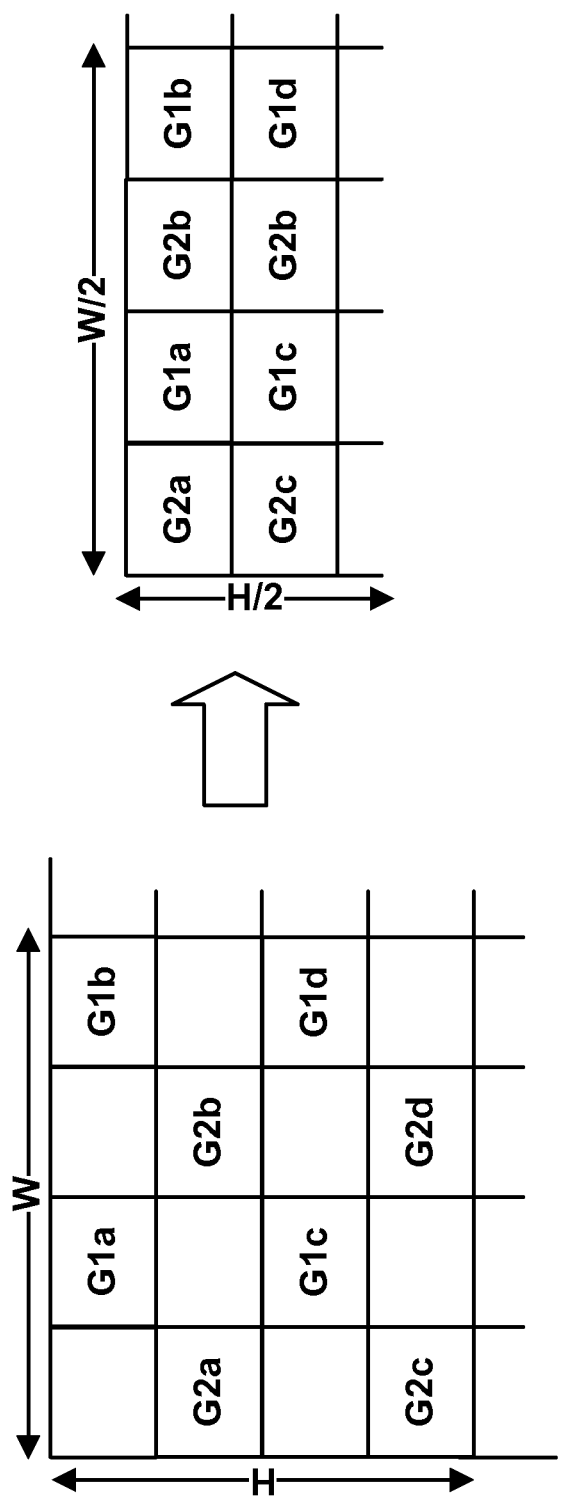
FIG. 4A: Alternative green pixel extraction into a single plane, although some uncorrelated elements

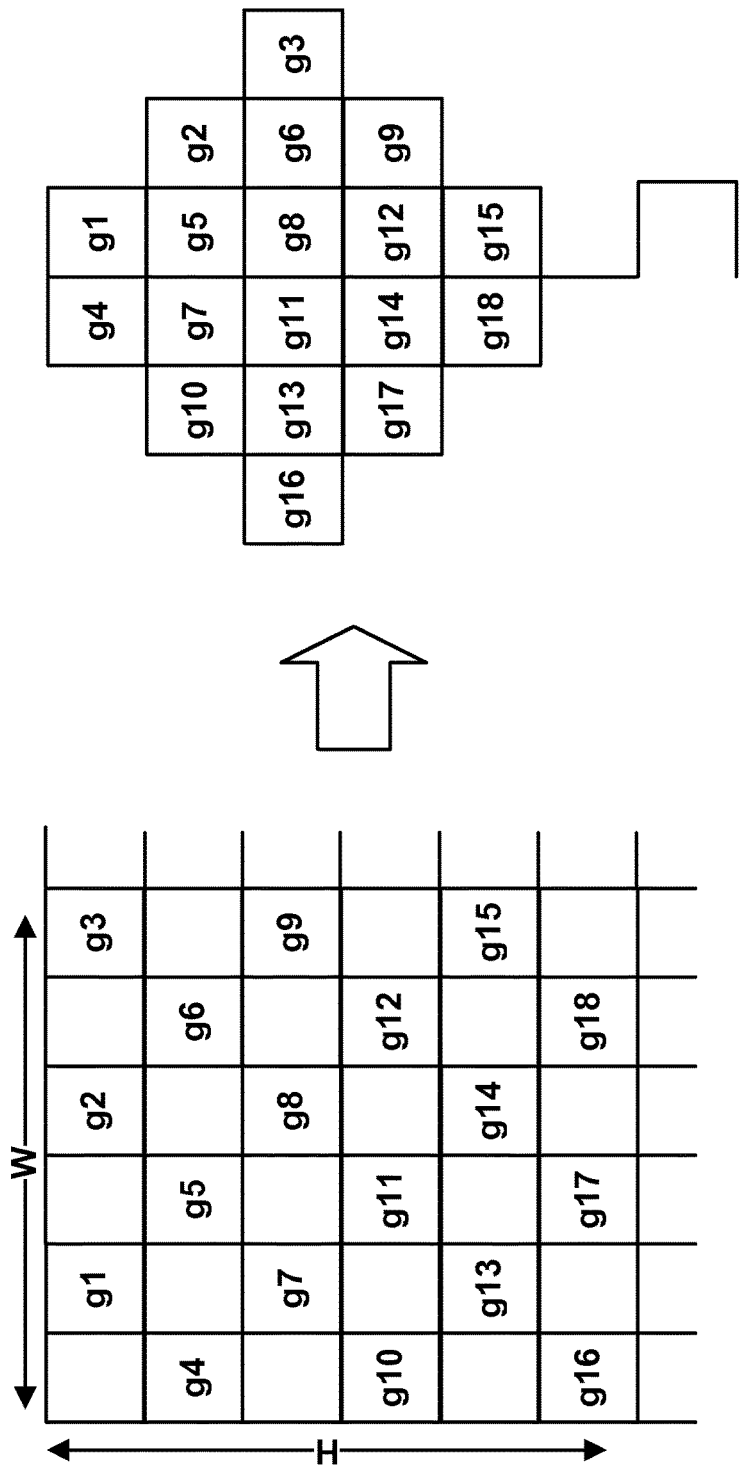
FIG. 4B: Alternative green pixel extraction into a single plane with high correlation elements but less convenient shape

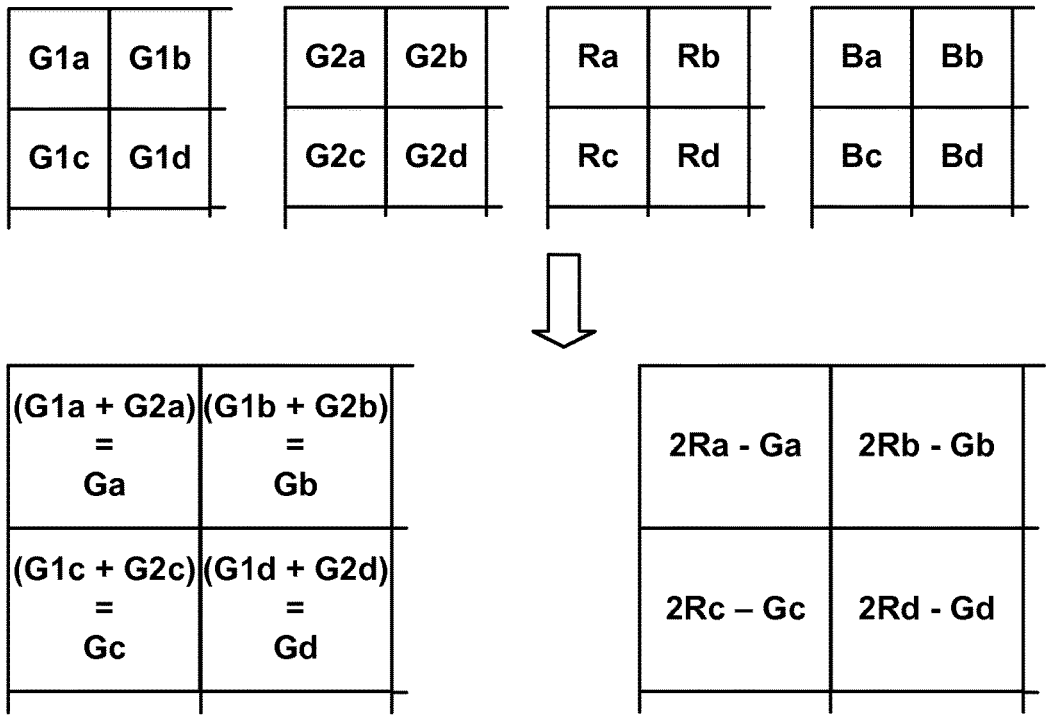
FIG. 5A: New summed green plane
FIG. 5B: Red minus the summed Green pane
FIG. 5C: Blue minus the summed Green plane
FIG. 5D: Green difference plane

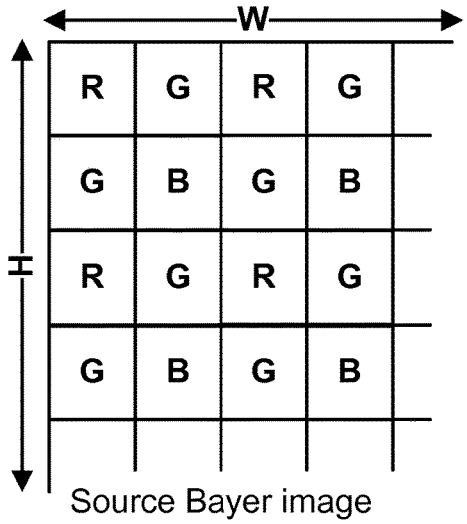

Source Bayer image

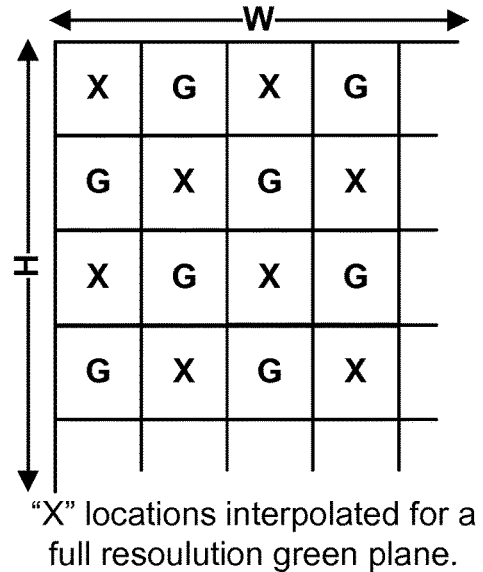

"X" locations interpolated for a full resoulution green plane.

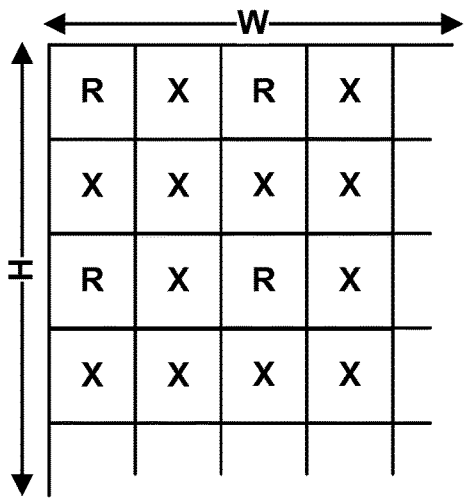

"X" locations interpolated for a full resolution red plane.

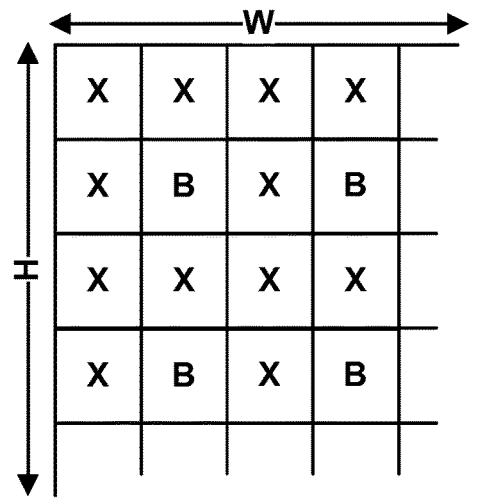

"X" locations interpolated for a full resolution blue plane.

Note: the demosaicing algorithms for calculating the values at the "X" locations are many. Any de-mosaic/de-bayering technique can be used, although with varying quality.

FIG. 6: De-bayer Interpolation

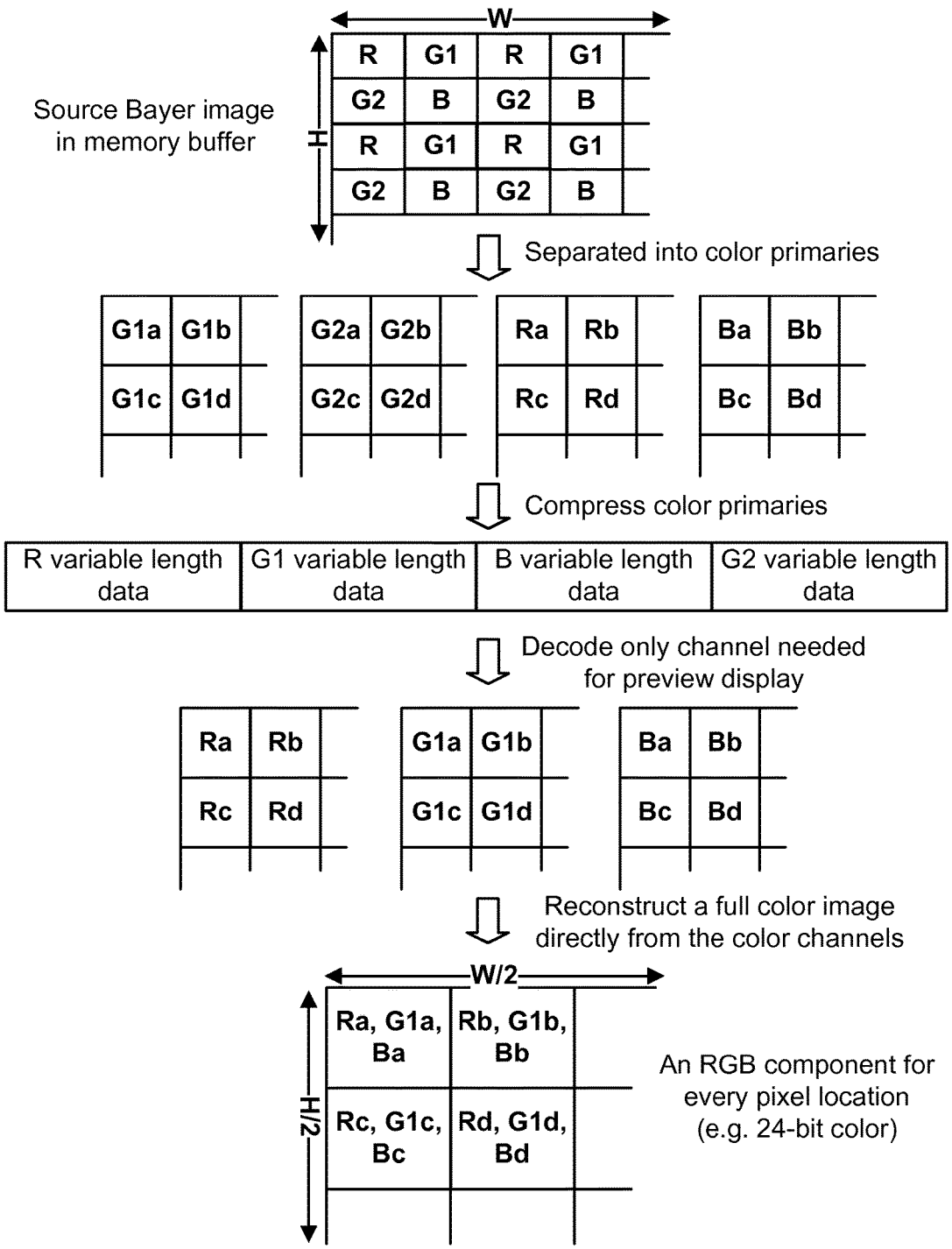
FIG. 7: Bayer compression with faster decode to an RGB display

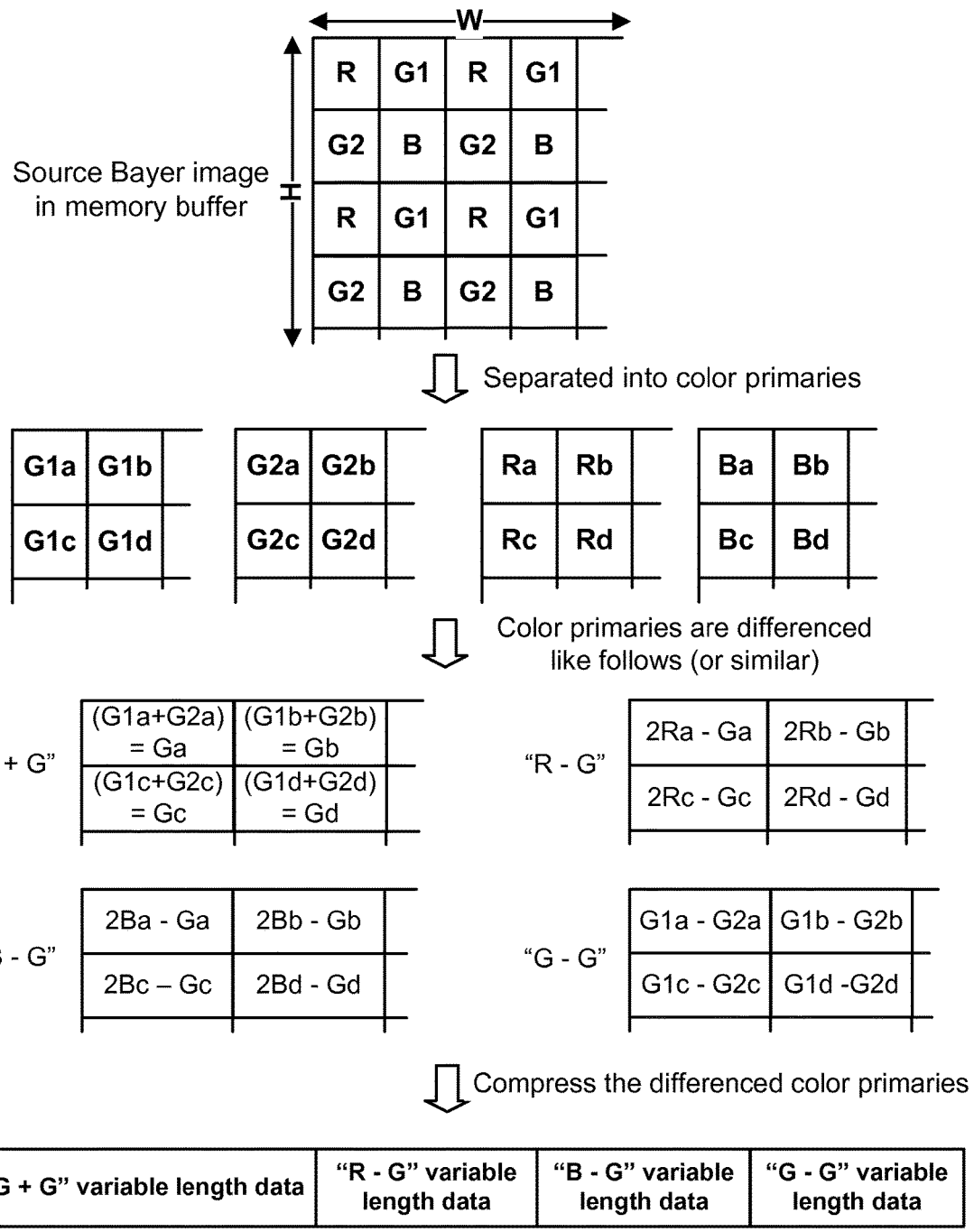
FIG. 8: Bayer compression with an example of color differencing

COMPRESSION AND DECODING OF SINGLE SENSOR COLOR IMAGE DATA

PRIORITY AND RELATED APPLICATIONS

This application is a continuation of and claims the benefit of priority to U.S. patent application Ser. No. 15/215,397, filed Jul. 20, 2016, now issued as U.S. Pat. No. 9,736,384, which is a continuation of and claims the benefit of priority to U.S. patent application Ser. No. 14/676,776, filed Apr. 1, 2015, now issued as U.S. Pat. No. 9,438,799, which is a continuation of and claims the benefit of priority to U.S. patent application Ser. No. 14/504,326, filed Oct. 1, 2014, now issued as U.S. Pat. No. 9,025,896, which is a continuation of and claims the benefit of priority to U.S. patent application Ser. No. 14/222,549, filed Mar. 21, 2014, now issued as U.S. Pat. No. 8,879,861, which is a continuation of and claims the benefit of priority to U.S. patent application Ser. No. 14/108,240, filed Dec. 16, 2013, now issued as U.S. Pat. No. 8,718,390, which is a continuation of and claims the benefit of priority to U.S. patent application Ser. No. 13/968,423, filed Aug. 15, 2013, now issued as U.S. Pat. No. 8,644,629, which is a continuation of and claims the benefit of priority to U.S. patent application Ser. No. 13/683,965, filed Nov. 21, 2012, now issued as U.S. Pat. No. 8,538,143, which is a continuation of and claims the benefit of priority to U.S. patent application Ser. No. 13/196,175, filed Aug. 2, 2011, now issued as U.S. Pat. No. 8,345,969, which is a continuation of and claims the benefit of priority to U.S. patent application Ser. No. 11/689,975, filed Mar. 22, 2007, now issued as U.S. Pat. No. 8,014,597, which claims the benefit under 35 U.S.C. § 119(e) of priority to Provisional Patent Application Ser. No. 60/784,866, entitled "Efficient Storage and Editing of High Resolution Single Sensor Color Video Data," filed Mar. 22, 2006. This application relates to U.S. patent application Ser. No. 10/779,335, entitled "System and Method for Encoding and Decoding Selectively Retrievable Representations of Video Content," filed Feb. 12, 2004. All of the foregoing applications are incorporated herein in their entirety by reference for all purposes.

FIELD OF THE ART

This present invention relates to compression and retrieval of video content gathered from a single-sensor imager.

BACKGROUND

Professional video cameras typically have three sensors to collect light, each filtered for red, green, and blue channels. Digital still photography typically does not employ a three-sensor design; digital still photography instead uses a single sensor design with individual pixels filtered for red, green, and blue (or other color primaries such as magenta, cyan and yellow.) This single-sensor color design is sometimes called a Bayer sensor, which is common in nearly all digital still cameras, both professional and consumer models. As the spatial resolution of video increases, there are numerous benefits in switching to the single-sensor Bayer design—as observed in some very high-end digital cinema cameras used for movie acquisition. Yet traditionally there are post-production workflow issues that arise when applying Bayer sensors to video applications.

Notably, image data collected from Bayer-pattern imagers (also known as RAW images) is neither YUV nor RGB, the most common color orientation expected by traditional post-production tools. This is true for both still cameras and emerging digital cinema cameras. This characteristic demands that existing industry tools either be "upgraded" so they are compatible with RAW images, or that new utilities be written that convert RAW images into traditional planar color spaces compatible with existing industry tools. The most common workflow employed by the industry today is to arithmetically convert RAW images into planar RGB images before common operations are performed, such as applying a saturation matrix or white balance, which is then followed by compressing or encoding the result into a smaller file size.

In order to extract full spatial and color information from a RAW image, a highly compute-intensive operation known as a "demosaic filter" must first be applied to each RAW image. The demosaic operation interpolates missing color primaries at each pixel location, as Bayer sensors only natively provide one primary color value per pixel location. These operations are generally performed by special algorithms residing inside the camera. In this situation the RAW image is never presented to the user, but instead the "developed" YUV or RGB image is presented to the user from the camera after internal processing, sometimes in the form of a compressed JPEG (or other compressed format) image. In the case of RAW modes on digital still cameras, some camera processing is delayed and performed outside the camera (most notably the compute-intensive demosaic processing). In this case the unprocessed RAW image is presented to the user from the camera, but prior to traditional YUV or RGB processing the demosaic (also known as de-Bayer) filter still must first be applied to the RAW image, but is done so outside the camera, yet the processing order described remains the same. The "developed" output of the de-Bayer filter operation is a planar image, usually RGB, but may also be other color primaries instead. A filter to correct color and contrast (compensating for sensor characteristics) is then applied to the planar image. Typically the planar image color space is further converted to a more compressible form such as YUV (common for DV, JPEG, or MPEG compression). The YUV image is compressed for delivery or storage, whether inside the camera or performed as a second step outside the camera.

In the RAW mode, some digital still cameras allow preprocessed sensor data to be written to the file along with metadata describing the cameras settings. A still-camera RAW mode does not achieve the workflow benefits described here, as it does not allow easy or fast previews, and the images can only be displayed by tools designed to understand the RAW format from Bayer-pattern imagers.

SUMMARY

Exemplary embodiments of the invention that are shown in the drawings are summarized below. These and other embodiments are more fully described in the detailed description section. It is to be understood, however, that there is no intention to limit the invention to the forms described in this Summary of the Invention or in the detailed description. One skilled in the art can recognize that there are numerous modifications, equivalents and alternative constructions that fall within the spirit and scope of the invention as expressed in the claims.

Embodiments of the invention describe systems and methods for effecting RAW Bayer compression using a camera by itself or an external device that performs the Bayer compression. In both cases this compressed stream is stored to a disk or memory system for later review and editing. During the review and editing stages, embodiments of the invention enable the new compressed video type to operate seamlessly within existing post production tools, without modification to those tools.

In one aspect of the present disclosure, a method for editing captured image data is disclosed. In one embodiment, the method includes: receiving image data corresponding to a first resolution captured by an image sensor of a camera, the image data comprising a plurality of image planes; encoding a subset of the image planes to produce a preview image at a second resolution that is lower than the first resolution, the subset of the image planes each corresponding to a different color component associated with the image data; receiving an edit operation to the preview image; and providing the image data and the received edit to an editing system, the editing system configured to decode the subset of the image planes to produce an image at the first resolution and to perform the received edit operation on the image at the first resolution.

In another aspect of the present disclosure, a system for editing image data is disclosed. In one embodiment, the system includes: an input configured to receive image data corresponding to a first resolution captured by an image sensor of a camera, the image data comprising a plurality of image planes; a processor configured to: encode a subset of the image planes to produce a preview image at a second resolution that is lower than the first resolution, each of the subset of the image planes corresponding to a different color component associated with the image data; and receive an edit operation to the preview image; and an output configured to provide the image data and the received edit to an editing system, the editing system configured to decode the subset of the image planes to produce an image at the first resolution and to perform the received edit operation on the image at the first resolution.

In another aspect of the present disclosure, a non-transitory computer-readable storage medium is disclosed. In one embodiment, the non-transitory computer-readable storage medium stores computer-readable instructions that, when executed by a hardware processor, cause an image processing system to: receive image data corresponding to a first resolution captured by an image sensor of a camera, the image data comprising a plurality of image planes; encode a subset of the image planes, each of the subset corresponding to a different color component associated with the image data, to produce a preview image at a second resolution that is lower than the first resolution; receive an edit operation to the preview image; and provide the image data and the received edit to an editing system, the editing system configured to decode the subset of the image planes to produce an image at the first resolution and to perform the received edit operation on the image at the first resolution.

BRIEF DESCRIPTION OF THE DRAWINGS

Various objects and advantages plus a more complete understanding of the invention are apparent and more readily appreciated by reference to the following detailed description and to the appended claims when taken in conjunction with the accompanying drawings wherein:

FIG. 1 shows the primary color layout for a typical "Bayer" image sensor which consists of twice as many green cells/pixels as red or blue cells. These pixels or cells are most commonly arranged in a 2×2 pixel grid as shown here.

FIG. 2 shows the separation of the red and blue channel color primaries into independent half-resolution channels.

FIG. 3 shows the separation of the green primary into two highly correlated channels.

FIG. 4A shows an alternative separation of the green primary into one channel with reduced correlation, but still effective.

FIG. 4B shows an alternative separation of green into a single channel that is highly correlated, but with an image shape that would require more advanced processing during compression.

FIG. 5A shows an implementation of green color summation, according to one embodiment.

FIG. 5B shows an implementation of red-green color differencing, according to one embodiment.

FIG. 5C shows an implementation of blue-green color differencing, according to one embodiment.

FIG. 5D shows an implementation of green color differencing, according to one embodiment.

FIG. 6 shows the pixels that are derived through de-Bayer filtering.

FIG. 7 shows an overview of Bayer compression for preview presentation.

FIG. 8 shows an overview of Bayer compression using color differencing.

DETAILED DESCRIPTION

The invention allows for video images from Bayer-style cameras to be processed in high resolution far more efficiently than the current state of the art. The interleaved color components within a Bayer sensor are typically arranged in 2×2 pixel squares over the entire image with red and green on the top pair, and green and blue on the bottom of each 2×2 pixel array. This pattern of interleaved red, green and blue pixels is problematic for compression as a single image because the spatially adjacent pixels are much less correlated and therefore less compressible than a plane of monochrome data. Compression operates most effectively when adjacent pixels have a high likelihood of being similar, yet in a Bayer image the adjacent pixels are filtered for different color primaries, so pixel magnitudes will vary greatly. Attempting direct compression of a Bayer image using common techniques such as DCT or wavelet compression will either result in little or no reduction of data size, or a significant amount of image distortion. This invention allows higher compression without introducing visually-damaging distortion of the image, using existing compression technologies like DCT and wavelet.

A single high definition Bayer frame of 1920×1080 interleaved red, green, and blue pixels can be separated into four planes of quarter-resolution images, each consisting 960× 540 pixels of either the red component, blue component, or one of the two green components. If red is the upper left pixel of the frame, a correlated red plane is fetched by reading every second pixel on every other scan-line. The same technique can be applied for all colors so that each plane contains the signal for one color primary. For the most common RGGB Bayer pattern imager, there are two green planes for each red and blue plane. It is possible to encode each of the planes using common compression techniques (DCT, Wavelet, etc.) such that significant data reduction is achieved without significant quality impacts. However, more compression may be obtained by differencing the channels in the following manner:

$G$=green plane1+green plane2

$R\text{-}G$=2×red plane−$G$ $B-G = 2 \times \text{blue plane} - G$ $D = \text{green plane1} - \text{green plane2}$ ($D$ for difference between the green planes)

These modified image planes are encoded (e.g., compressed) just as they would if they were separate planes of R, G and B, or Y, U and V components. Other planar differencing algorithms could be used to decrease the size of the compressed data output yielding a similar result. Reordering the data into planes of the color primaries is not compute intensive, and the operation is reversible. No data is added or lost as it is with de-Bayer processing.

De-Bayer filtering (or demosaicing) is the process of interpolating the missing color components at every pixel location. As acquired, the Bayer sensor only collects one of the three color primaries at every pixel site—the two other primaries are predicted via a range of different algorithms that typically take substantial compute time for high quality results. In the above 1920×1080 encoding example, the compressed video image produced will be smaller in data size yet higher in visual quality than results from existing techniques used in today's video cameras. If a Bayer image is to be compressed in a format like MPEG or HOV, then de-Bayering (a.k.a. demosaicing) will expand the single plane of 1920×1080 pixel data into three 1920×1080 planes, one for each color primary. This increases the size of the data by 3×, and does not benefit the compression (much larger compressed files result), and potentially introduces visual artifacts depending on the choice of de-Bayer filter applied (no de-Bayer algorithm is ideal). Although disadvantages (larger file sizes and visual impairments) are clearly evident in this example, this is the standard approach used in single-sensor video cameras. By encoding four quarter-resolution planes versus three full-resolution planes, the computational load is greatly reduced, allowing for simpler implementations and longer camera battery life. The size of the compressed data is reduced significantly, allowing for longer record times or alternatively reduced storage requirements for the captured video.

Although advantages for encoding four quarter-resolution planes are evident, the resulting compressed image would not be playable using typical hardware or software tools, as no viewing or editing tools anticipate four quarter-resolution planes instead of three full-resolution planes. A modification to the decompression algorithm will solve this problem. By way of example, a traditional three-plane 1920×1080 encoding would present a full-resolution 1920×1080 image upon decode. The codec, which is a combination of the compressor and the decompressor, is just a black box to the viewer or editing tool. Codecs normally are intended to precisely reproduce their input(s). In this invention, the decoder will change its default behavior depending on how it is being used, and modify its output as needed by the application. For fast preview/playback the decoder will reconstruct the image at quarter resolution of the source (in this example 960× 540), and to do this it only needs to decode Channel G, R-G and B-G to provide a standard RGB image to the requesting tool. As this is just for preview, the reconstructed RGB planes require no de-Bayer step to produce a good quality video output. Further, decoding of three quarter-resolution channels is significantly faster than decoding three full-resolution channels, resulting in reduced costs of the player and editing system. The decreased resolution is of minor or no issue for preview applications within post-production for film or television, and is in fact an advantage in many situations, yet this would not be suitable for a live event where high-quality full-resolution decoding is needed immediately (for live projects more traditional camera processing is better suited). Fortunately most video productions undergo a shot selection process and editing stage, which is one area where this invention is well-suited.

By way of example, a fast decode mode may perform the following method outlined in the following paragraphs. During the fast decode mode, only the necessary planes are decompressed. If the unmodified red, green1, green2, and blue planes were encoded, only one of the two green channels needs to be presented for preview. This selection of decoding three of the four channels offers additional performance. When color differencing is applied, the RGB planes would be reconstructed as follows:

Red plane = $(R-G+G)$ divide 2

Green plane = $G$ divide 2

Blue plane = $(B-G+G)$ divide 2

The fourth channel of the two differenced green channels in not required for a preview playback. The resulting three color primary channels can be presented to the playback/editing application as a standard quarter-resolution image, even though those channels were originally derived from a larger Bayer image. The slight spatial offset of each color plane, such as red pixels being sampled from a slightly different location than the blue or green pixels, does not present an issue for fast preview/playback. The image quality is high. The three color channels are typically interleaved in a RGBRGBRGB . . . format for display. Each pixel now has the needed three primary colors for display. As an optional step, if the application can only support full resolution (versus quarter resolution), then using a simple bi-linear interpolation or pixel duplication may be performed by the decoder on the quarter-resolution image to quickly convert it to a full-resolution RGB image. This operation is significantly faster than performing a high-quality demosaic filter in real time. For higher quality full-resolution presentation, the decoder performs de-Bayer filtering so the post-production tools can manipulate a traditional full-resolution image. DeBayer filtering is slow because it is highly compute intensive, and certain embodiments of the invention allow transfer of the processing from the camera to the post-production stage at which point the processing is typically performed on powerful computer workstations and is more suited to high-quality de-Bayer processing. Workflow also gains efficiency through this change, For example, a film or television production will on average record 20 times the length of source footage as compared with the length of the edited product. In this example, a two-hour movie will likely have 40 hours of source footage. The compute-expensive de-Bayer processing is now only needed on 5% on the acquired video because it is performed at the end of the workflow instead of at the beginning. In addition, the review process to select this 5% of the video is now easier and faster because the data size and computational load are much smaller. This compares to more traditional handling of Bayer-format source data on which de-mosaic processing must be performed on 100% of the data before it is even viewable.

By way of a new example, a full-resolution decode mode may perform the method outlined in the following paragraphs. During the full-resolution decode mode, all four quarter-resolution planes are decoded. Any color-plane differencing is reversed so that planes of red, green1, green2 and blue are restored. The resulting planes are interleaved back into the original Bayer layout, and the result of the decode now matches the original source image. A de-Bayer operation is performed to convert the image into a full raster RGB frame and this result is presented to the calling application.

De-Bayer filters are typically non-linear filters designed with flexibility to offer a significant range of characteristics. Because of this, the style of de-Bayer filter may be selectable, either directly by the user or automatically via the type of operation being performed by the editing tools. As an example, the "export" mode from an NLE, when the result is intended to be transferred to film for viewing, would use the highest quality de-Bayer filter, whereas scrubbing the timeline in a nonlinear editor would use a simpler/faster filter).

One skilled in the art will recognize that, because the original video data size is unwieldy, today's post-production world typically scales high-resolution images to approximately one-quarter resolution to select shots for editing. This technique is called "offline" editing. Once an offline edit session is completed, a "conform" process is used to gather only the necessary full-resolution files (e.g., now 5% of the source—although the large full-resolution files have to be archived somewhere) to complete the TV/feature production. Certain embodiments of the invention achieve much the same workflow without the expensive steps of image scaling and conforming, and offer much smaller archival storage requirements. This novel new workflow is further enhanced by allowing full-resolution decodes whenever the editing/user needs, which is not possible in offline editing. Switching between very fast preview-decode and full-resolution de-Bayer output is made automatically in one embodiment. For example, playback and review may use the fast decode mode, while single-frame review and export may be performed at full resolution.

When the de-Bayer operation is not performed in the camera, the choices for post-production image enhancement are greatly improved. For example, the selection of the specific de-Bayer filter can be made after post-production when the edited material is exported to its final presentation format. A lower quality, but more efficient, de-Bayer filter can be used for real-time preview during editing and a higher quality algorithm, which may be computationally slower, can be used for export (e.g., to film or a digital presentation format). Workflow is improved further because preprocessed sensor data is better for adjusting color characteristics such as white balance, contrast and saturation during post-production.

Embodiments of the invention may be used to improve any existing compression algorithm for encoding and decoding. No new compression technologies are required to enable direct Bayer processing. For example, algorithms including DCT, wavelet, or others can be used. The compression can be lossy or lossless. The codec must decode to the format used by the post-production tools, otherwise the tools would need to be updated to be aware of the new format. To maintain compatibility with the widest range of video applications the Bayer codec is wrapped in one or more of the standard media interfaces, such as QuickTime, DirectShow, Video for Windows, etc. These media interfaces allow existing applications to gain support for new media types, without requiring any internal knowledge of the media's structure. By using the standard codec wrapper of these common media interfaces, even RAW data can be presented to an application by developing the image to the format requirements of the calling application. Video cameras that offer codec-less (uncompressed) raw acquisition, and which do not abstract the format through a codec wrapper, require special tools within post-production to convert this data into a more traditional form before review and editing can begin, introducing a cumbersome workflow.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for editing captured image data, the method comprising:

receiving, by an image processing system, image data corresponding to a first resolution captured by an image sensor of a camera, the image data comprising a plurality of image planes;

encoding, by the image processing system, a subset of the image planes to produce a preview image at a second resolution that is lower than the first resolution, the subset of the image planes each corresponding to a different color component associated with the image data;

receiving, by the image processing system, an edit operation to the preview image; and providing, by the image processing system, the image data and the received edit to an editing system, the editing system configured to decode the subset of the image planes to produce an image at the first resolution and to perform the received edit operation on the image at the first resolution.

2. The method of claim 1, wherein the encoding of the subset of the plurality of image planes comprises encoding all of the plurality of image planes.

3. The method of claim 1, wherein the encoding of the subset of the plurality of image planes comprises encoding fewer than all of the plurality of image planes.

4. The method of claim 1, wherein the encoding of the subset of the image planes comprises combining the subset of the image planes to produce the preview image.

5. The method of claim 1, wherein the received edit operation comprises identifying a subset of the image data.

6. The method of claim 5, further comprising performing a de-Bayer operation only on the identified subset of the image data.

7. The method of claim 5, further comprising providing only the identified subset of the image data to the editing system.

8. A system for editing image data, the system comprising:

an input configured to receive image data corresponding to a first resolution captured by an image sensor of a camera, the image data comprising a plurality of image planes;

a processor configured to:
encode a subset of the image planes to produce a preview image at a second resolution that is lower than the first resolution, each of the subset of the image planes corresponding to a different color component associated with the image data; and
receive an edit operation to the preview image; and an output configured to provide the image data and the received edit to an editing system, the editing system configured to decode the subset of the image planes to produce an image at the first resolution and to perform the received edit operation on the image at the first resolution.

9. The system of claim 8, wherein the subset of the plurality of image planes comprises all of the plurality of image planes.

10. The system of claim 8, wherein the subset of the plurality of image planes comprises less than all of the plurality of image planes.

11. The system of claim 8, wherein the encode of the subset of the image planes comprises combining the subset of image planes to produce the preview image.

12. The system of claim 8, wherein the received edit operation identifies a subset of the image data.

13. The system of claim 12, wherein the editing system performs a de-Bayer operation only on the identified subset of the image data.

14. The system of claim 12, wherein the image processing system provides only the identified subset of the image data to the editing system.

15. A non-transitory computer-readable storage medium storing computer-readable instructions that, when executed by a hardware processor, cause an image processing system to:
   receive, by the image processing system, image data corresponding to a first resolution captured by an image sensor of a camera, the image data comprising a plurality of image planes;
   encode, by the image processing system, a subset of the image planes, each of the subset corresponding to a different color component associated with the image data, to produce a preview image at a second resolution that is lower than the first resolution;
   receive, by the image processing system, an edit operation to the preview image; and
   provide, by the image processing system, the image data and the received edit to an editing system, the editing system configured to decode the subset of the image planes to produce an image at the first resolution and to perform the received edit operation on the image at the first resolution.

16. The non-transitory computer-readable storage medium of claim 15, wherein the subset of the plurality of image planes comprises all of the plurality of image planes.

17. The non-transitory computer-readable storage medium of claim 15, wherein the subset of the plurality of image planes comprises less than all of the plurality of image planes.

18. The non-transitory computer-readable storage medium of claim 15, wherein the encode of the subset of image planes comprises combining the subset of image planes to produce the preview image.

19. The non-transitory computer-readable storage medium of claim 15, wherein the received edit operation identifies a subset of the image data.

20. The non-transitory computer-readable storage medium of claim 19, wherein the editing system performs a de-Bayer operation only on the identified subset of the image data.

21. The non-transitory computer-readable storage medium of claim 19, wherein the image processing system provides only the identified subset of the image data to the editing system.

* * * * *